United States Patent [19]

Martinelli et al.

[11] Patent Number: 5,072,113
[45] Date of Patent: Dec. 10, 1991

[54] POLARIMETRIC FIBRE-OPTIC SENSOR HAVING DEFORMATION MEANS

[75] Inventors: Mario Martinelli, San Donato Milanese; Valeria Gusmeroli, Milan; Paolo Vavassori, Bergamo, all of Italy

[73] Assignee: Centro Informazioni Studi ed Esperienze S.p.A., Milan, Italy

[21] Appl. No.: 579,866

[22] Filed: Sep. 7, 1990

[30] Foreign Application Priority Data

Sep. 12, 1989 [IT] Italy .............................. 21681 A/89

[51] Int. Cl.⁵ .............................................. H01J 5/16
[52] U.S. Cl. .......................... 250/227.16; 250/227.17; 250/227.19
[58] Field of Search ...................... 250/227.17, 227.16, 250/227.19, 227.27, 225; 356/73.1, 345, 351; 350/96.2, 96.33, 96.29, 96.21

[56] References Cited

U.S. PATENT DOCUMENTS

| | | | |
|---|---|---|---|
| 4,536,088 | 8/1985 | Rashleigh et al. | 356/345 |
| 4,725,143 | 2/1988 | Jones et al. | 356/351 |
| 4,896,942 | 1/1990 | Onstott et al. | 350/96.33 |
| 4,904,863 | 2/1990 | McDearmon | 350/96.33 |
| 4,906,068 | 3/1990 | Olson et al. | 350/96.2 |
| 4,970,385 | 11/1990 | Tatsuno et al. | 250/227.17 |

Primary Examiner—David C. Nelms
Assistant Examiner—Que T. Le
Attorney, Agent, or Firm—Hedman, Gibson, Costigan & Hoare

[57] ABSTRACT

In a polarimetric fibre-optic sensor using a polarization-maintaining optical fibre with two light propagation modes, a reference light signal is fed to propagate along the optical fibre in accordance with one propagation mode, a series of measurement light signals being induced by a series of optical fibre deformation elements, to propagate along the optical fibre in accordance with the other propagation mode, each being unbalanced in time with respect to the reference light signal by an amount which is different from that of the other measurement light signals; by using particular interferometric techniques, compensating the unbalances and analyzing the signals resulting from the interference between the measurement light signals and the reference light signal it is possible to determine and locate a physical phenomenon which disturbs the optical fibre.

16 Claims, 3 Drawing Sheets

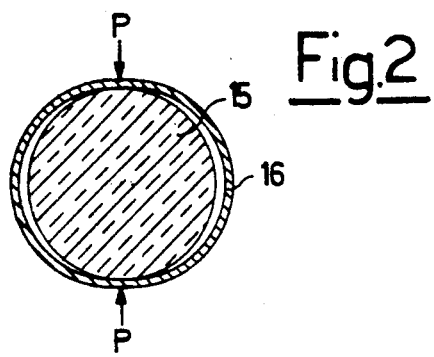
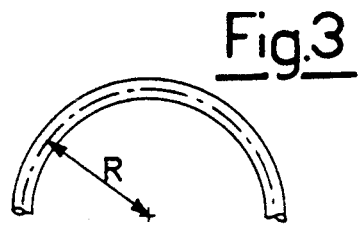
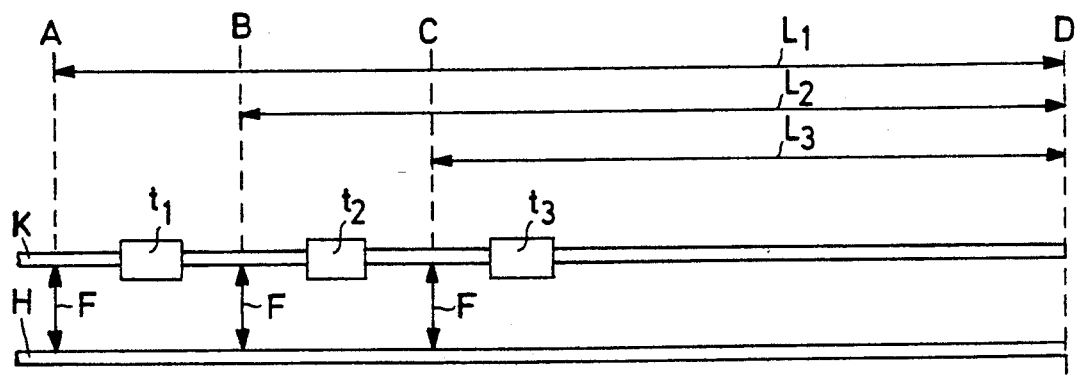

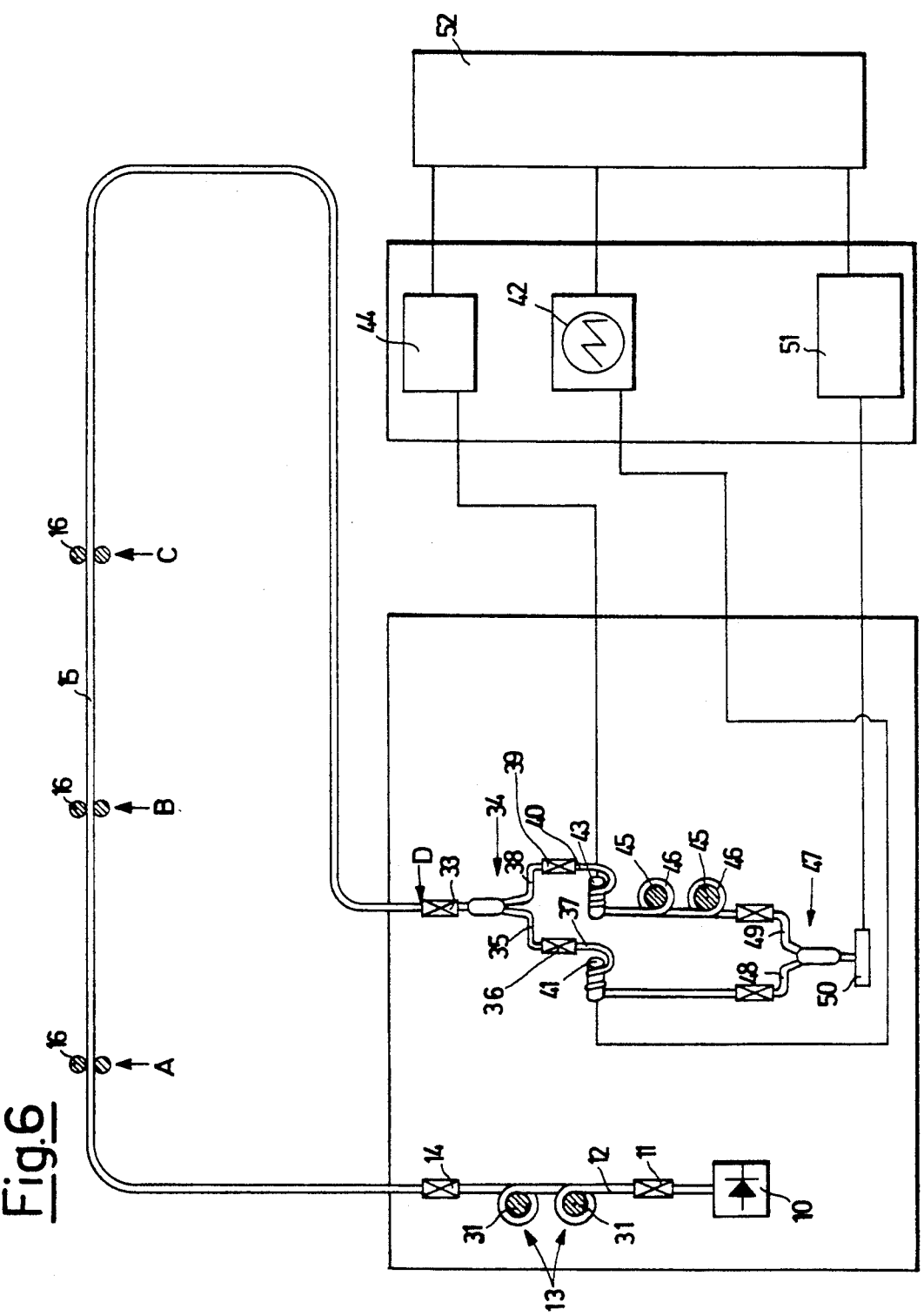

POLARIMETRIC FIBRE-OPTIC SENSOR HAVING DEFORMATION MEANS

This invention relates to a polarimetric fibre-optic sensor.

General fibre-optic sensors are known in which a physical phenomenon which disturbs the optical fibre, such as a mechanical deformation, a temperature variation or the like, creates a variation in a light beam passing through the optical fibre, this variation being proportional to the extent of the disturbance and being measurable by interferometric methods. In this manner such sensors can indicate the existence and extent of the physical phenomenon which disturbs the optical fibre, and can have the most varied application.

In particular, polarimetric fibre-optic sensors using a polarization-maintaining optical fibre are known. A characteristic of this type of optical fibre is that it has two propagation modes or geometrically coinciding "channels" within which two light signals of different polarization propagate without interacting. Within these "channels" the two said light signals have different propagation velocities. Basically, a reference light signal and a measurement light signal of different polarization are fed through the optical fibre so as to run along said "channels" with different speeds of propagation. The physical phenomenon which disturbs the optical fibre has the effect of varying the difference in the propagation velocity of the two light signals. On leaving the optical fibre the two light signals are separated on the basis of their different polarization, are then set to the same polarization state and are then recombined to generate an interference signal. The variation in the difference between the propagation velocities of the two light signals results in a variation in the intensity of the interference signal, and by measuring this latter information is obtained on the existence and extent of the physical phenomenon which disturbs the optical fibre.

These known polarimetric fibre-optic sensors have however the serious limitation of not allowing spatial location of the disturbing physical phenomenon, i.e. of not enabling that part of the optical fibre subjected to the disturbing physical phenomenon to be identified.

On the other hand, a fibre-optic sensor offering this latter characteristic would satisfy measurement and monitoring requirements in various fields of application. For example it would enable the distribution of deformations in large-dimension critical structures such as bridges, dams, aeroplanes, electrical generators, pressurized containers etc. to be measured. In the same manner it would allow plural-spot temperature distribution to be measured in boilers, power transformers, electric cables etc. In addition the considerable compatibility between the optical fibre and composite materials points to an interesting application in the development of intelligent structures in which the optical fibres would perform the function of both sensor and structural material simultaneously.

Various types of fibre-optic sensors allowing said spatial location have in effect been proposed, but some of these are of low sensitivity and low spatial resolution, while others are invasive and bulky and therefore considerably limited in their application.

The object of the present invention is to provide a polarimetric fibre-optic sensor which enables the physical phenomenon which disturbs the optical fibre to be located in space.

This object is attained by a polarimetric fibre-optic sensor comprising a polarization-maintaining optical fibre with two light propagation modes, characterised by comprising a linearly polarized light source connected to said optical fibre to emit a reference light signal which propagates along the optical fibre in accordance with one of said propagation modes;

a plurality of deformation means acting on said optical fibre to deform said optical fibre in a corresponding plurality of points of the optical fibre, said deformation means creating a corresponding plurality of measurement light signals which propagate along the optical fibre in accordance with the other of said propagation modes, said measurement light signals being out of balance in time with said reference light signal by an extent of unbalance which is different from one to another;

interferometric means connected to said optical fibre to compensate the unbalance between said measurement light signals and said reference light signal and generate an interference signal between each of the measurement light signals and the reference light signal;

processor means connected to said interferometric means to process data relative to the compensation of the unbalance between said measurement signals and said reference signal, and data relative to the interference signals, to determine and locate a physical phenomenon disturbing the optical fibre.

One embodiment of the present invention is described hereinafter by way of non-limiting example with reference to the accompanying drawings in which:

FIGS. 2, 3 and 4 show possible alternative mechanical actions which can be exerted along a component of said sensor;

FIG. 5 is a graph showing phenomena which take place within said sensor component;

FIG. 6 shows the sensor of FIG. 1, in which a set of its components has been modified.

Figure 1:
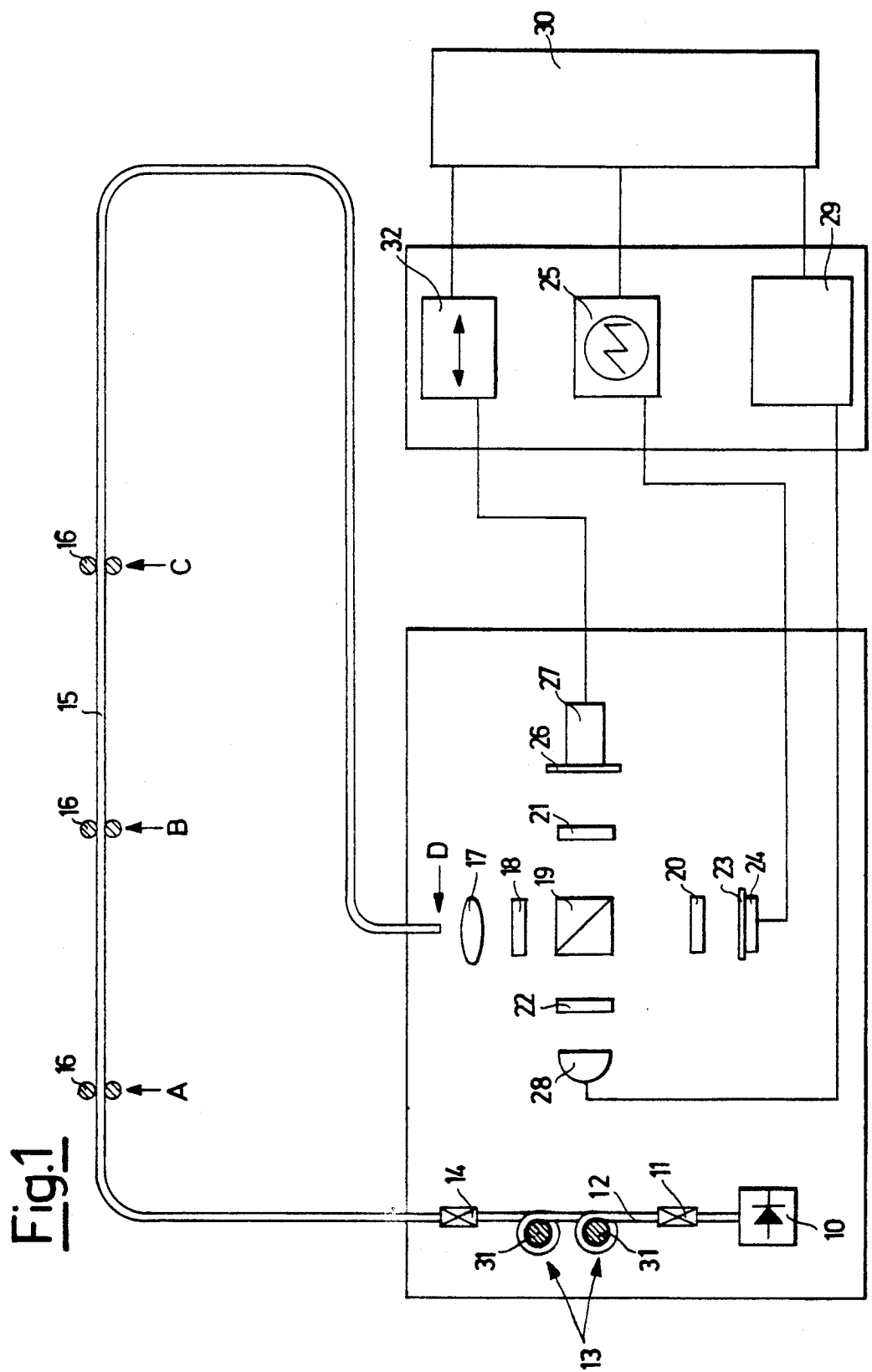
FIG. 1 is a schematic illustration of a polarimetric fibre-optic sensor according to the invention.

The polarimetric fibre-optic sensor shown in FIG. 1 comprises a linerly polarized light source 10 which emits a reference light signal along a polarization plane.

The exit of the source 10 is connected via an optical connector 11 to a low birefringence optical fibre 12 which is looped along two portions to form rings 13, by wrapping the optical fibre 12 about suitable cylindrical supports 31.

The optical fibre 12 is connected by an optical connector 14 to a polarization-maintaining optical fibre 15. Along the optical fibre 15 there are positioned three rings 16, each of which exerts a side constriction on the optical fibre 15 as shown in FIG. 2. Basically, each ring 16 is mounted about the optical fibre 15 and is then deformed in such a manner as to exert on the optical fibre 15 two opposite forces P at two diametrically opposite points thereof as shown in said FIG. 2. The three points of the optical fibre 15 at which the three rings 16 act are indicated by A, B, C.

At the exit of the optical fibre 15, indicated by D, there is positioned a light collimation lens 17. A half wave delay plate 18 is positioned downstream of the lens 17. A beam splitter of polarization-discrimination type is arranged downstream of the delay plate 18. Corresponding with the beam splitter 19 there are provided two quarter wave delay plates 20 and 21 and a polarizer 22.

In a position corresponding with the delay plate 20 there is provided a mirror 23 fixed to a piezoceramic support 24 fed by an oscillator 25.

Corresponding with the delay plate 21 there is provided a mirror 26 fixed to a slider 27 driven by a stepping motor 32.

A photodetector 28 is positioned to correspond with the polarizer 22 and is connected to a phase demodulator 29.

The stepping motor 32, oscillator 25 and demodulator 29 are connected to a processor unit 30.

The operation of the described polarimetric fibre-optic sensor is as follows.

As already explained in the introduction the optical fibre 15 being of the polarization-maintaining type has two propagation modes, or two geometrically coinciding "channels", within which two light signals of different polarization propagate without interacting.

The reference light signal emitted by the source 10 propagates via the optical connector 11 into the optical fibre 12 and from here propagates via the optical connector 14 into the optical fibre 15. The purpose of the optical fibre 12 and its loops 13 is to set the state of polarization of the reference light signal so that said light signal propagates along the optical fibre 15 in accordance with one of the two propagation modes of this latter, or in other words so that said light signal propagates along one of said "channels".

At point A in the optical fibre 15, because of the deformation in the optical fibre determined by the first ring 16, a so-called power coupling is induced between the two propagation modes. This means that a fraction of the power of the reference light signal is transferred from one to the other propagation mode of the optical fibre 15, to generate a first measurement light signal which propagates in accordance with this other propagation mode.

As already explained in the introduction, this first generated measurement light signal propagates at a different velocity, in the present example it being assumed that this is a lower velocity than the propagation velocity of the reference light signal. At point B of the optical fibre 15 there is again power coupling between the two propagation modes because of the optical fibre deformation determined by the second ring 16, with the result that a second measurement light signal is generated and propagates in accordance with the propagation mode of the first measurement light signal at a velocity less than the propagation velocity of the reference light signal. Likewise, at point C of the optical fibre 15 there is further power coupling between the two propagation modes because of the optical fibre deformation determined by the third ring 16 with the result that a third measurement light signal is generated and propagates in accordance with the propagation mode of the first and second light signal at a propagation velocity less than the propagation velocity of the reference light signal.

Basically, at the exit D of the optical fibre 15 there are a reference light signal plus three measurement light signals, the reference light signal being propagated in accordance with one of the propagation modes of the optical fibre 15, the other three measurement light signals being propagated in accordance with the other of the two propagation modes of the optical fibre 15. The first measurement light signal travels a path L1 equal to the length of the optical fibre portion between point A and point D and has a delay relative to the reference light signal equal to the sum of the delays accumulated along the portion between point A and point B, along the portion between point B and point C, and along the portion between point C and point D, these delays called t1, t2, t3 respectively. Likewise the second measurement light signal travels a path L2 equal to the length of the optical fibre portion between point B and point D and has a delay relative to the reference light signal equal to the sum of the delays t2, t3, whereas the third measurement light signal travels a path L3 equal to the length of the optical fibre portion between point C and point D and has a delay relative to the reference light signal equal to t3. This situation is shown by the graph of FIG. 5 in which H indicates the propagation mode of the reference light signal, K the propagation mode of the measurement light signals, and the double arrows F the power couplings at the points A, B, C, with the exit point D, the paths L1, L2, L3 and the delays t1, t2 and t3 also being shown.

From the aforegoing, at the exit D of the optical fibre 15 three measurement light signals are unbalanced in time with respect to the reference light signal because of said delays, each measurement light signal having an unbalance value with respect to the reference light signal which is different from the unbalance value of the other measurement light signals.

Said light signals leaving the exit D of the optical fibre 15 are collimated by the lens 17 and then pass through the delay plate 18 which orientates the polarization axes so that they coincide with those of the subsequent beam splitter 19. The light signals then reach said beam splitter where the reference light signal is separated from the measurement light signals. The reference light signal is fed in the direction of the delay plate 20 whereas the measurement light signals are deviated in the direction of the delay plate 21. The reference light signal passes through the delay plate 20 and then strikes the mirror 23 by which it is reflected to again pass through the delay plate 20, be deviated by the beam splitter 19 and pass through the polarizer 22, to finally strike the photodetector 28. The measurement light signals pass through the delay plate 21 to strike the mirror 26 and be reflected by it to again pass through the delay plate 21, through the beam splitter 19 and the polarizer 22 and finally strike the photodetector 28.

The beam splitter 19, the delay plates 20 and 21 and the polarizer 22 are components which enable the reference light signal polarization and measurement light signal polarization to be controlled, such as to make the two polarizations equal so that interference between the reference light signal and each measurement light signal becomes possible. However, this interference cannot take place under the conditions in which said light signals exist at the exit D of the optical fibre 15, because of the unbalance between each measurement light signal and the reference light signal.

To compensate this unbalance the slider 27 is provided, this being driven by the stepping motor 32 to move the mirror 26 so as to compensate the unbalance between a determined measurement light signal and the reference light signal by varying the optical path of the measurement light signal.

If for example the unbalance between the first measurement light signal and the reference light signal is compensated in this manner, there appears on the photodetector 28 an interference signal resulting from the interference between the first measurement light signal and the reference light signal. If that portion of the optical fibre corresponding to the path L1 is disturbed by physical phenomena, there will again be a small unbalance between the first measurement light signal and the reference light signal due to the variation in the propagation velocity difference between these two light signals. This small unbalance results in a variation in said interference signal on the photodetector 28, a variation which can be detected and quantified by known analysis methods. In this manner not only is information on the existence and extent of the physical disturbing phenomenon obtained but also information to the effect that this physical disturbing phenomenon is located along that portion of the optical fibre corresponding to the path L1.

It should be noted that this compensation and the interference signal, and thus the measurement, relate only to the reference light signal and the first measurement light signal, as the other two measurement light signals are unbalanced with respect to the reference light signal by a value different from that of the first measurement light signal. To obtain this, the light source 10 is preferably of low coherence. In addition the rings 16 must not be excessively close.

Likewise by compensating the unbalance between the second measurement light signal and the reference light signal in the aforesaid manner, information can be obtained on the existence and extent of a physical phenomenon disturbing that portion of the optical fibre corresponding to the path L2.

Finally, by compensating the unbalance between the third measurement light signal and the reference light signal, information can be obtained on the existence and extent of a physical phenomenon disturbing that portion of the optical fibre corresponding to the path L3.

In this manner the optical fibre 15 is divided into partly superimposed sensitive portions L1, L2, L3. Because of this it is possible to determine a disturbing physical phenomenon along each of said sensitive portions, and by investigating each portion in sequence it becomes possible to know in greater detail which of the optical fibre segments resulting from the difference between one portion and another is specifically affected by the disturbing physical phenomenon, or in other words whether the physical phenomenon has appeared between the points A, B or between the points A, C or between the points B, C. In this respect, if for example a disturbing physical phenomenon is detected in the optical fibre portion corresponding to the path L1 but no disturbing physical phenomenon is detected in the optical fibre portion corresponding to the path L2, this shows that the disturbing physical phenomenon has affected the optical fibre segment between the points A and B. In this manner a polarimetric fibre-optic sensor is obtained which enables the physical phenomenon disturbing the optical fibre to be located in space.

If the disturbing physical phenomenon to be detected is dynamic, i.e. variable with time, the interference signal can be analyzed by known phase demodulation techniques. For this purpose the piezoceramic support 24, fed by the oscillator 25 with a sawtooth electrical signal, causes the mirror 23 to oscillate correspondingly, to generate a carrier wave which is phase-modulated by the phase of the measurement light signal involved in the measurement, which thus forms the modulating signal. The demodulator 29 then enables the modulating signal to be extracted. If the disturbing physical phenomenon to be detected is static, it is not necessary to use phase demodulation techniques and the piezo ceramic support 24 and oscillator 25 are therefore not required. In this case the contrast of the interference signal can be analyzed to evaluate for example the difference between it and a maximum contrast value. This difference can be evaluated by moving the mirror 26 by means of the slider 27 until the interference signal is at maximum contrast. The movement undergone by the slider is clearly proportional to the extent of the disturbing physical phenomenon.

To process the data relative to the interference signal from the photodetector 28 and the data relative to the movement of the stepping motor 32 to determine which measurement light signal is interfering with the reference light signal, the processor unit 30 is provided to supply information relative to the existence, extent and spatial location of the disturbing physical phenomenon. The processor unit 30 can also control the stepping motor 32 and oscillator 25.

It should be noted that the same results are obtained if the reference light signal is directed towards the mirror 26 by the beam splitter 19 and the measurement light signals are directed towards the mirror 23 by the beam splitter 19.

The sensor as described and illustrated has numerous advantages. Firstly it represents an instrument of high sensitivity and reliability.

By arranging a suitable number of rings along the polarization-maintaining optical fibre, a high spatial resolution can be obtained. In the illustrated embodiment only three rings are shown by way of example.

There is also a degree of measurement excess in the sense that the sensitive optical fibre portions are partly superimposed. For example, with reference to the described sensor, if the first measurement light signal were no longer determinable for some reason, the other two measurement light signals would in any event enable information to be obtained relative to the two optical fibre portions L2, L3 and thus a large part of the optical fibre 15 would remain sensitive.

It should also be added that the sensitive element consists of a single polarization-maintaining optical fibre, and that the described embodiment maintains the mechanical integrity, dimensions and geometry of the optical fibre, ie it requires no special maintenance.

This sensor has the advantage of simplicity and is therefore constructionally economical, and in addition is compact and therefore occupies little space.

It can determine various types of disturbing physical phenomena, such as a mechanical disturbance, a temperature change etc. It also has various applications, such as those described in the introduction.

It is apparent that modifications and additions can be made to the sensor as described and illustrated.

Instead of the two optical connectors 11 and 14 and the low birefringence optical fibre 12 with the loops 13, optical components of equivalent function can be used such as delay plates associated with coupling lenses for light in fibre.

The polarization-maintaining optical fibre 15 can be of any length according to the requirements of the application. The number of rings 16 can vary widely.

Instead of the rings, other means can be used to determine the lateral force on the points along the optical fibre, such as grippers, clamps or the like.

The power coupling obtained by exerting a lateral force on the points along the optical fibre can also be obtained by means of other types of deformation at the points along the optical fibre, for example by bending a small portion of this latter as an arc of radius R as shown in FIG. 3, or by twisting it with a twist T as shown in FIG. 4. Various means can be used for obtaining these deformations, for example grippers or clamps, or a small portion of optical fibre can be deformed and then fixed in this deformed state by gluing it onto a support.

In general, the deformations at the points along the optical fibre and the means for achieving the deformation for the purpose of obtaining the aforesaid power coupling can be of various types.

The described interferometric means illustrated in FIG. 1 can be replaced by a series of other components performing equivalent functions.

One example is shown in FIG. 6.

The exit D of the optical fibre 15 is connected in this case via an optical connector 33 to a bidirectional optical fibre coupler 34 which separates the reference light signal from the measurement light signals. One branch 35 of the coupler 34 is connected via an optical connector 36 to an optical fibre 37. The other branch 38 of the coupler 34 is connected via an optical connector 39 to a further optical fibre 40. A portion of the optical fibre 37 passes about a piezoceramic cylinder 41 connected to an oscillator 42. A portion of the optical fibre 40 passes about a piezoceramic cylinder 43 connected to an exciter 44 and two further portions pass about two respective cylindrical supports 45 to form two loops 46. The optical fibres 37 and 40 are connected to a further optical fibre directional coupler 47. The optical fibre 37 is connected to one branch 48 of the coupler 47 and the other optical fibre 40 is connected to the other branch 49 of the coupler 47.

The coupler 47 is also connected to a photodetector 50 connected to a phase demodulator 51. The oscillator 42, the exciter 44 and the demodulator 51 are connected to a processor unit 52.

The couplers 34 and 47 perform equivalent functions to those of the beam splitter 19 of the scheme of FIG. 1. The couplers 34 and 47, the optical fibre 37, and the optical fibre 40 with the rings 46 are components which enable the reference light signal polarization and measurement light signal polarization to be controlled, such as to make the two polarizations equal so that interference between the reference light signal and each measurement light signal becomes possible, i.e. these components perform functions equivalent to those of the beam splitter 19, the delay plates 20 and 21 and the polarizer 22 of the scheme of FIG. 1. The piezoceramic cylinder 43 and the exciter 44 perform functions equivalent to those of the slider 27 and stepping motor 32, in that the exciter 44 on exciting the piezoceramic cylinder 43 causes it to expand to an extent which is a function of the excitation the intensity, to thus lengthen the fibre 40, this having substantially the same effect as moving the mirror 26. The piezoceramic cylinder 41 and the oscillator 42 perform functions equivalent to those of the piezoceramic support 24 and oscillator 25, in that the oscillator 42 alternately excites and de-excites the piezoceramic cylinder 41 causing it to expand and then return to its rest position, with corresponding lengthening of the fibre 37 and its return to its rest position, this having substantially the same effect as the oscillations of the mirror 23. The coupler 47 causes the reference light signal and the measurement light signals to converge onto the photodetector 50 on which the interference occurs, exactly as in the case of the photodetector 28 of the scheme of FIG. 1. The demodulator 51 performs the same function as the demodulator 29, and the processor unit 52 gives, on the basis of the data received by the photodetctor 50 and exciter 44, the same information as the processor unit 30.

Interferometric means can be provided comprising a plurality of interferometers each of which compensates the unbalance of one respective measurement light signal and causes it to interfere with the reference light signal. The interferometers would be connected to a processor unit arranged to give the same information as the processor units 30 and 52. However in this case the processor unit simultaneously analyzes the various measurement light signals in parallel, whereas in the case of the schemes of FIGS. 1 and 6 the analysis is in time succession.

It should be noted that the measurement light signals can either lag behind the reference light signal, as in the aforedescribed and illustrated example, or can lead it. If the reference light signal propagates along the faster "channel" of the polarization-maintaining optical fibre, it will lead the measurement light signals, and vice versa. In both cases the measurement light signals are unbalanced in time with respect to the reference light signal.

We claim:

1. A polarimetric fibre-optic sensor comprising a polarization-maintaining optical fibre with two light propagation modes, characterised by comprising a linearly polarized light source connected to said optical fibre to emit a reference light signal which propagates along the optical fibre in accordance with one of said propagation modes;

a plurality of deformation means acting on said optical fibre to deform said optical fibre in a corresponding plurality of points of the optical fibre, said deformation means creating a corresponding plurality of measurement light signals which propagate along the optical fibre in accordance with the other of said propagation modes, said measurement light signals being out of balance in time with said reference light signal by an extent of unbalance which is different from one to another;

interferometric means connected to said optical fibre to compensate the unbalance between said measurement light signals and said reference light signal and generate an interference signal between each of the measurement light signals and the reference light signal;

processor means connected to said interferometric means to process data relative to the compensation of the unbalance between said measurement signals and said reference signal, and data relative to the interference signals, to determine and locate a physical phenomenon disturbing the optical fibre.

2. A fibre-optic sensor as claimed in claim 1, wherein said deformation means consist of a ring slipped onto the optical fibre to clamp the optical fibre.

3. A fibre-optic sensor as claimed in claim 2, wherein said ring presses against said optical fibre with two diametrically opposite forces.

4. A fibre-optic sensor as claimed in claim 1, wherein said interferometric means comprise optical means which separate said measurement light signals from said reference light signal and recombine them by adjusting them to the same polarization plane and directing them onto a photodetector, and further comprise means which vary the optical path of the measurement light signals relative to the optical path of the reference light signal to effect said unbalance compensation.

5. A fibre-optic sensor as claimed in claim 4, wherein said optical means comprise a collimation lens which collimates the exit light signals from said optical fibre onto a first delay plate, downstream of which there is a beam splitter which directs the reference light signal onto a first mirror via a second delay plate and the measurement light signals onto a second mirror via a third delay plate, the light signals reflected by said mirrors and again passing through the respective delay plates being recombined by said beam splitter and directed onto said photodetector via a polarizer.

6. A fibre-optic sensor as claimed in claim 5, wherein one of said mirrors is fixed to a slider driven by a motor, said slider and said motor forming said optical path variation means.

7. A fibre-optic sensor as claimed in claim 5 or 6, wherein one of said mirrors is fixed to a piezoceramic support fed by an oscillator, the output of said photodetector being connected to a demodulator.

8. A fibre-optic sensor as claimed in claim 4, wherein said optical means comprise a first optical fibre directional coupler connected to said polarization-maintaining optical fibre to separate said measurement light signals from said reference light signal, and a second optical fibre directional coupler connected to said first coupler to recombine said light signals by directing them onto said photodetector, each of said couplers being provided with two branches, the branches of one coupler being connected to the branches of the other coupler via two respective connecting optical fibres, one of said connecting optical fibres comprising loop portions.

9. A fibre-optic sensor as claimed in claim 8, wherein optical fibre expansion means constituting said optical path variation means act on one of said connecting optical fibres.

10. A fibre-optic sensor as claimed in claim 9, wherein said expansion means comprise an exciter-fed piezoceramic cylinder about which the connecting optical fibre is wrapped.

11. A fibre-optic sensor as claimed in one of claims 8, 9 and 10, wherein means act on one of said connecting optical fibres to expand the connecting optical fibre in an oscillating manner, said photodetector being connected to a demodulator.

12. A fibre-optic sensor as claimed in claim 11, wherein said oscillating expansion means comprise a oscillator-fed piezoceramic cylinder about which the connection optical fibre is wrapped.

13. A fibre-optic sensor as claimed in claim 1, wherein said interferometric means generate said interference signals in time succession.

14. A fibre-optic sensor as claimed in claim 1, wherein said interferometric means generate all said interference signals simultaneously.

15. A fibre-optic sensor as claimed in claim 1, wherein said light source is of low coherence.

16. A fibre-optic sensor as claimed in claim 1, wherein said light source is connected to said polarization-maintaining optical fibre via a low birefringence optical fibre comprising loop portions.

* * * * *